United States Patent
Tanigawa et al.

(10) Patent No.: US 9,008,479 B2
(45) Date of Patent: Apr. 14, 2015

(54) MULTICORE FIBER

(71) Applicant: Fujikura Ltd., Tokyo (JP)

(72) Inventors: Shoji Tanigawa, Sakura (JP); Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/846,127

(22) Filed: Mar. 18, 2013

(65) Prior Publication Data

US 2013/0308913 A1 Nov. 21, 2013

Related U.S. Application Data

(63) Continuation of application No. PCT/JP2011/078250, filed on Dec. 7, 2011.

(30) Foreign Application Priority Data

Dec. 9, 2010 (JP) ................................. 2010-274663

(51) Int. Cl.
*G02B 6/036* (2006.01)
*G02B 6/02* (2006.01)

(52) U.S. Cl.
CPC .................................. *G02B 6/02042* (2013.01)

(58) Field of Classification Search
CPC ......................... G02B 6/02042; G02B 6/03644
USPC .......................................................... 385/126
See application file for complete search history.

(56) References Cited

U.S. PATENT DOCUMENTS

| 5,452,394 A * | 9/1995 | Huang ........................... 385/123 |
| 2005/0008308 A1 * | 1/2005 | Bita et al. ...................... 385/123 |
| 2007/0201793 A1 * | 8/2007 | Askins et al. .................... 385/37 |
| 2011/0002580 A1 | 1/2011 | Hasegawa et al. |

FOREIGN PATENT DOCUMENTS

| EP | 2256527 A1 * | 12/2010 | ...................... 385/11 |
| EP | 2 345 915 A1 | 7/2011 | |
| JP | 61-141406 A | 6/1986 | |
| JP | 61141406 A * | 6/1986 | ................... 385/126 |
| JP | 2011-197661 A | 10/2011 | |
| WO | 2009/107667 A1 | 9/2009 | |
| WO | 2010/038863 A1 | 4/2010 | |

OTHER PUBLICATIONS

International Search Report for PCT/JP2011/078250, mailing date of Jan. 17, 2012.
M. Koshiba et al., "Heterogeneous multi-core fibers: proposal and design principle", IEICE Electronics Express, vol. 6, No. 2, pp. 98-103, (2009).

* cited by examiner

*Primary Examiner* — Jerry Blevins
(74) *Attorney, Agent, or Firm* — Westerman, Hattori, Daniels & Adrian, LLP

(57) ABSTRACT

A multicore fiber has a plurality of cores; and a clad which surrounds an outer peripheral surface of each of the cores, and at least one of the cores is spirally arranged such that the core rotates around a center axis of the clad. By arranging the cores in this way, it is possible to prevent crosstalk between specific cores from escalating even when the multicore fiber is disposed in a bent state.

12 Claims, 6 Drawing Sheets

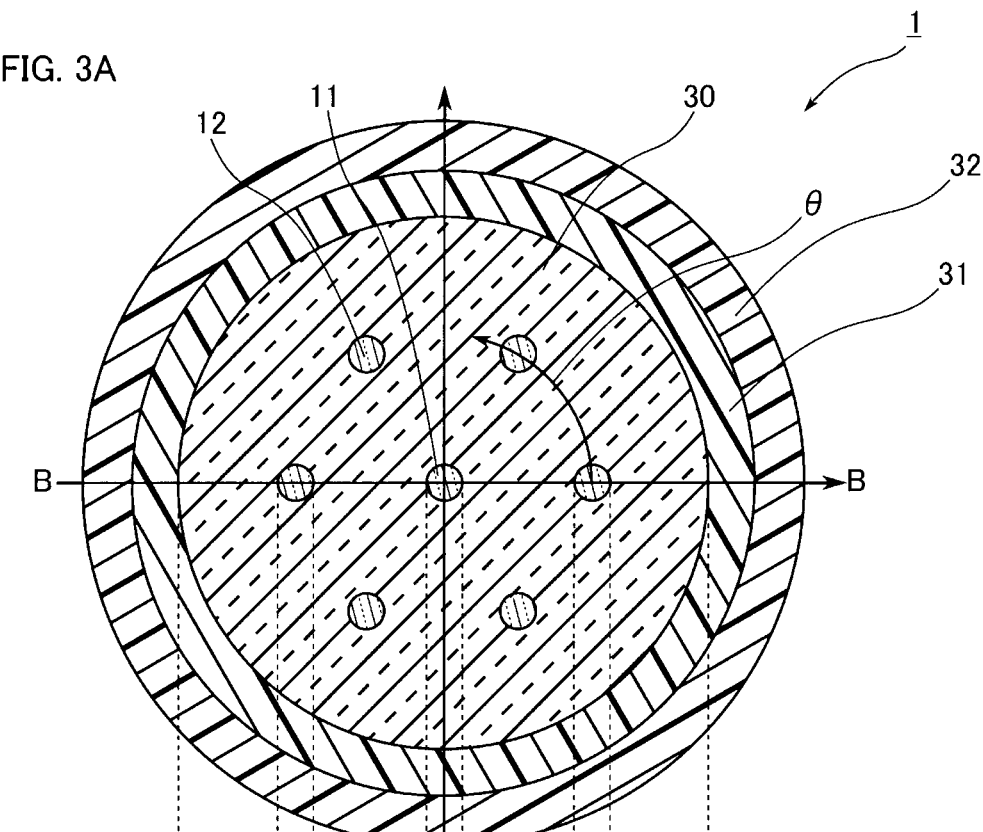
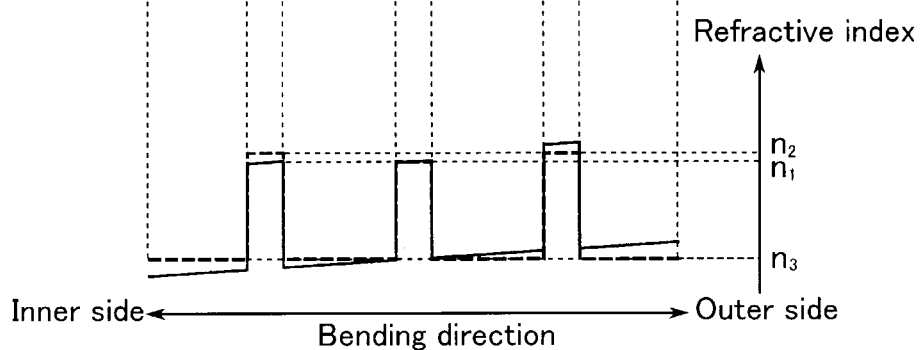

MULTICORE FIBER

TECHNICAL FIELD

The present invention relates to a multicore fiber, and, more particular, relates to a multicore fiber which can prevent deterioration of crosstalk between specific cores even when the multicore is disposed non-linearly.

BACKGROUND ART

Currently, optical fibers used for optical fiber communication systems which are generally spreading adopt a structure in which an outer periphery of one core is surrounded by a clad, and information is transmitted when an optical signal propagates in this core. Further, as the optical fiber communication systems spread, the amount of information to be transmitted is dramatically increasing in recent years. Following an increase in the amount of information to be transmitted, the optical fiber communication systems use several tens or several hundreds of multiple optical fibers to perform long-distance optical communication of a large volume.

It is known that, to reduce the number of optical fibers in such an optical fiber communication system, a plurality of signals are transmitted by means of light propagating in respective cores using a multicore fiber in which outer peripheries of a plurality of cores are surrounded by one clad.

Following Non-Patent Document 1 discloses an example of such a multicore fiber. In this multicore fiber, a plurality of cores are arranged in one clad. However, as is pointed out in Non-Patent Document 1, in the multicore fiber, optical signals propagating in respective cores interfere each other, and noise is superimposed on the optical signals propagating in the respective cores in some case. Hence, Non-Patent Document 1 discloses changing relative refractive index differences of the respective cores with respect to the clad as one method for reducing crosstalk between the cores.

CITATION LIST

Non-Patent Document

[Non-Patent Document 1] Masanori KOSHIBA, "Heterogeneous multi-core fibers: proposal and design principle" IEICE Electronics Express, Vol. 6, No. 2, 98 to 103

SUMMARY OF INVENTION

Objects to be Achieved by the Invention

As disclosed in above Non-Patent Document 1, by changing relative refractive index differences of the respective cores with respect to the core, propagation constants (waveguide conditions) of optical signals in adjacent cores become different, thereby surely reducing crosstalk. However, optical fibers are not only disposed linearly but also disposed non-linearly. When, for example, optical fibers are disposed drawing an arc having a certain diameter, if one of adjacent cores is arranged inside the arc and the other one is arranged outside the arc, propagation constants of respective lights in the adjacent cores match in some cases. Further, depending on a situation in which optical fibers are disposed, a state in which propagation constants of respective lights in adjacent cores match continues for a long time. When a state in which propagation constants of respective lights in adjacent cores match continues for a long time, there is an issue that crosstalk between the respective cores is likely to occur.

That is, even when propagation constants of lights in adjacent cores are varied by, for example, changing relative refractive index differences of the adjacent cores with respect to a clad, if optical fibers are non-linearly disposed, there is a concern that crosstalk between specific cores is likely to occur.

It is therefore an object of the present invention to provide a multicore fiber which can prevent deterioration of crosstalk between specific cores even when the multicore is disposed non-linearly.

Means for Achieving the Objects

A multicore fiber according to the present invention has: a plurality of cores; and a clad surrounding an outer peripheral surface of each of the cores, and at least one of the cores is arranged spirally such that the core rotates around a center axis of the clad.

In this multicore fiber, the position of the spirally arranged core in a vertical cross-section of the fiber in the longitudinal direction changes along the longitudinal direction of the fiber. Hence, even when this multicore fiber is disposed and a section in which propagation constants of lights in a specific spirally arranged core and another core is produced, a positional relationship between this specific core and another core changes along the longitudinal direction of the fiber, so that propagation constants of lights in these cores do not generally match over a long section. Consequently, it is possible to prevent deterioration of cross talk between this specific core and another core even when the multicore fiber is disposed in a bent state. In addition, the another core may be a core arranged in the spiral pattern or a core arranged on a line.

Further, in the multicore fiber, the spiral core preferably has a section in which a pitch at which the core rotates around the center axis of the clad changes.

Thus, the core has the section in which the pitch at which the core rotates spirally changes, so that, even when, for example, the multicore fibers are twisted to make an optical cable and the multicore fibers are disposed drawing an arc of a certain diameter cyclically, the core has a section in which a rotation pitch changes, so that it is possible to prevent propagation constants of lights in a specific core and another core from matching over a long section.

In addition, the "pitch" herein means the number of rotations of the spiral core per unit length in the longitudinal direction of the fiber. Hence, when, for example, the spiral core rotates once around the center axis of the clad per 1 meter of the fiber, the pitch of this core is 1 time/m.

Further, in the multicore fiber, the pitch of the spiral core preferably changes at all sections.

Thus, the pitch at which the core spirally rotates changes at all sections, so that, even when a cyclic arc is drawn as described above, it is possible to further reduce a distance in which propagation constants of lights in the specific core and another core match.

Further, in the multicore fiber, the spiral core preferably repeats rightward rotation and leftward rotation around the center axis of the clad.

Thus, by spirally arranging the core to repeat rightward rotation and leftward rotation, fibers can be manufactured by being rotated rightward and leftward alternately in the longitudinal direction, so that manufacturability improves compared to optical fibers adopting a structure in which cores rotate only in one direction and, consequently, it is possible to provide a multicore fiber having spiral cores at low cost.

In addition, herein, "the number of rotations" upon spiral rotation of the core which repeats leftward rotation and leftward rotation around the center axis of the clad means the number of rotations in case that the number of rightward rotations and the number of leftward rotations are added as positive values. Hence, when, for example, the spiral core rotates 0.5 times to the right around the center axis of the clad in a section of 0.5 m of the fiber and then rotates 0.5 times to the left in a subsequent section of 0.5 m, the number of rotations per 1 m is 0.5+0.5=1 time and the pitch of the core in this case is 1 time/m.

Further, in the multicore fiber, an average length of a section for the rightward rotation and an average length of a section for leftward rotation of the spiral core are preferably equal.

Furthermore, in the multicore fiber, a length of each section for the rightward rotation and a length of each section for leftward rotation of the spiral core may not be fixed.

Still further, in the multicore fiber, two or more cores are preferably spirally arranged such that the cores rotate around the center axis of the clad, and the spiral cores each preferably rotate at a pitch equal to or more than 1 time/m on average around the center axis of the clad, from the view point of further suppressing variation in crosstalk between respective spirally arranged cores, and, moreover, the cores preferably rotate at a pitch equal to or more than 4 time/m on average, from the view point of further suppressing variation in this crosstalk.

Moreover, in the multicore fiber, the spiral core and a core adjacent to the spiral core preferably have different refractive indices, and, moreover, the spiral core and the core adjacent to the spiral core also preferably have different diameters.

According to the multicore fiber, propagation constants of lights between the spiral core and the core adjacent to the spiral core are basically different, so that it is possible to reduce crosstalk.

Further, in the multicore fiber, the two or more cores may be arranged at equal intervals along an outer peripheral direction of the clad, and may be spirally arranged such that the cores rotate around the center axis of the clad in an identical direction.

Furthermore, in the multicore fiber, one of the cores may be arranged along the center axis of the clad.

Still further, in the multicore fiber, the respective cores preferably allow propagation of lights in a single mode with respect to a wavelength of use.

According to this multicore fiber, it is possible to increase a transmission speed of each core and further suppress crosstalk by allowing propagation of light in a single mode.

Effect of the Invention

As described above, according to the present invention, it is possible to provide a multicore fiber which can prevent deterioration of crosstalk between specific cores even when the multicore is disposed non-linearly.

BRIEF DESCRIPTION OF THE DRAWINGS

FIG. 3A and FIG. 3B are a view illustrating a state of the multicore fiber when the multicore fiber is bent.

EMBODIMENT OF THE INVENTION

Figure 1A:
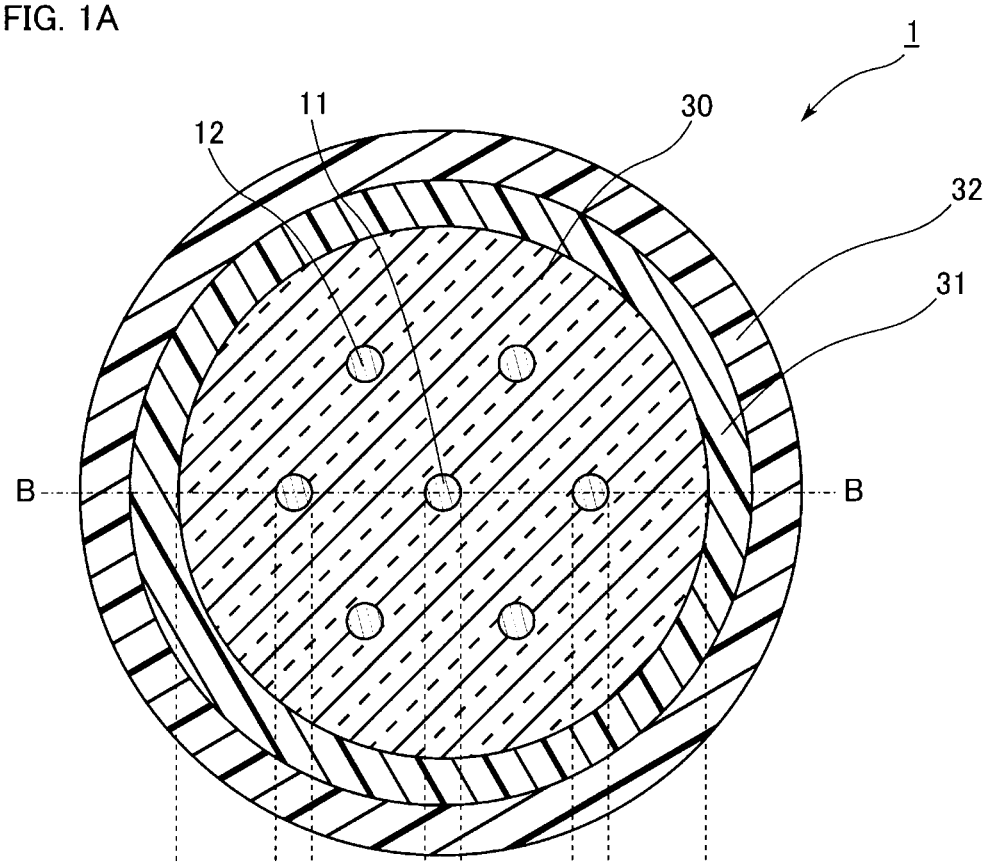
FIG. 1A and FIG. 1B are a view illustrating a state of a multicore fiber according to an embodiment of the present invention.

A preferred embodiment of a multicore fiber according to the present invention will be described in detail below referring to the drawings. In addition, for ease of understanding, a scale disclosed in each drawing and a scale disclosed below are different in some cases.

Figure 1B:
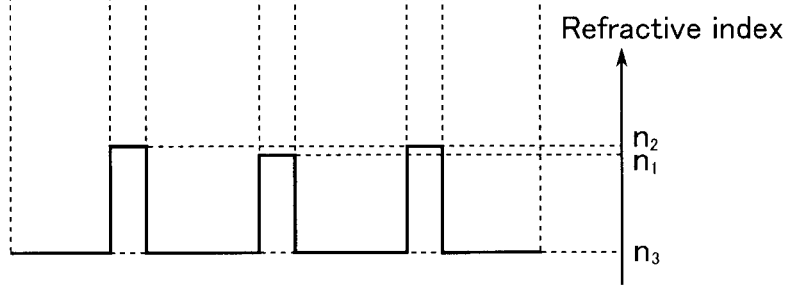

FIG. 1 is a view illustrating a state of a multicore fiber according to an embodiment of the present invention, and, more specifically, FIG. 1A is a view illustrating a structure in a vertical cross-section of the multicore fiber in a longitudinal direction and FIG. 1B is a view illustrating a refractive index distribution in a B-B line in FIG. 1A. In addition, FIG. 1B illustrates the refractive index distribution when the multicore fiber is linear.

As illustrated in FIG. 1A, a multicore fiber 1 according to the embodiment has a plurality of cores 11 and 12, a clad 30 which entirely surrounds a plurality of cores 11 and 12 and fills between the respective cores 11 and 12, and which surrounds outer peripheral surfaces of the respective cores 11 and 12, an inner protective layer 31 which covers the outer peripheral surface of the clad 30 and an outer protective layer 32 which covers the outer peripheral surface of the inner protective layer 31.

With the embodiment, the number of cores is seven, and one core 11 is arranged in the center, and the other six cores 12 are arranged along the outer periphery of the clad 30 at equal intervals. Thus, the center core 11 and the respective outer periphery side cores 12 are arranged in a triangular grid. Hence, inter-center distances between the cores 11 and 12 are equal. A plurality of cores 11 and 12 arranged in this way are arranged symmetrically with respect to the center axis of the clad 30. That is, when the multicore fiber 1 is rotated at a predetermined angle around the center axis of the clad 30, the positions of the respective outer periphery side cores after rotation are the positions of the other outer periphery side cores 12 before rotation. Further, the core arranged in the center does not move even when the multicore fiber 1 is rotated around the center axis. The respective cores 11 and 12 are arranged at positions symmetrically with respect to the center axis of the clad 30, so that it is possible to make the optical property resulting from an arrangement of the respective cores 11 and 12 uniform.

Further, with the embodiment, diameters of the respective adjacent cores 11 and 12 are slightly different from each other. Although the size of each member forming this multicore fiber 1 is not limited in particular, the diameter of the core 11 arranged in the center is, for example, 6.9 μm, the diameters of the cores 12 arranged on the outer periphery side are made different at, for example, about 3% with respect to the diameter of the core 11 arranged in the center, and the diameters of the adjacent cores 12 arranged in the outer periphery side are made different at, for example, about 0.5% to 5% from each other. Thus, even when the diameters of the adjacent cores 11 and 12 are physically slightly different, the diameters of the respective cores 11 and 12 are not substantially different for lights propagating in the cores 11 and 12 and virtually the same optical characteristics are provided, and the diameters of the adjacent cores 11 and 12 are physically slightly different, so that it is possible to suppress crosstalk between the adjacent cores 11 and 12. In this case, the difference between the diameters of the adjacent cores 11 and 12 is preferably 1% to 5% of the diameters from the view point of suppressing crosstalk and equalizing optical characteristics of the respective cores.

Further, the diameter of the clad 30 is, for example, 124 μ, the outer diameter of the inner protective layer 31 is, for example, 190 μm and the outer diameter of the outer protective layer 32 is, for example, 250 μm. Furthermore, the inter-center distances between the respective cores 11 and 12 are not limited in particular, and are, for example, 37 μm.

Still further, as illustrated in FIG. 1B, with the embodiment, a refractive index $n_1$ of the core 11 arranged in the center and refractive indices $n_2$ of the respective cores 12 arranged on the outer periphery side are higher than a refractive index $n_3$ of the clad 30, and the refractive indices $n_2$ of the respective cores 12 arranged on the outer periphery side are higher than the refractive index $n_1$ of the core 11 arranged in the center. In addition, although the refractive indices of the adjacent cores 12 are preferably different among the cores 12 arranged on the outer periphery side from the view of point of suppressing crosstalk between the respective outer periphery side cores 12, the embodiment will be described for ease of understanding assuming that the refractive indices of the cores 12 arranged on the outer periphery side are equal as described above. In addition, the differences between the refractive indices of the adjacent cores 11 and 12 are preferably 1% to 5% of the refractive indices from the view point of suppressing crosstalk and equalizing the optical characteristics of the respective cores.

In addition, in FIG. 1B, refractive indices of the inner protective layer 31 and the outer protective layer 32 will not be described.

In the multicore fiber, materials of the cores 11 and 12 are, for example, silica glass doped with a dopant such as germanium which increases the refractive indices, and a material of the clad 30 is silica glass which is not doped with any dopant. Further, materials of the inner protective layer 31 and the outer protective layer 32 are ultraviolet curable resin.

Furthermore, with the embodiment, lights propagate in the respective cores 11 and 12 in a single mode.

In addition, a propagation constant of light propagating in a core of an optical fiber is defined based on a relative refractive index difference Δ based on the core refractive index with respect to the refractive index of the clad, and the diameter of the core. Meanwhile, when i=1, 2 is true, the relative refractive index differences $\Delta_i$ of the cores 11 and 12 of the refractive indices $n_i$ with respect to the clad 30 is defined according to the following equation.

$$\Delta_i = \frac{n_i^2 - n_3^2}{2n_i^2}$$

The relative refractive index differences $\Delta_1$ and $\Delta_2$ of the cores 11 and 12 and the diameters of the cores are defined according to a mode field diameter MFD which needs to be provided as a characteristic. Further, when, for example, the diameters of the cores 11 and 12 are about 7.2 μm as described above and wavelengths of lights propagating in the cores 11 and 12 are 1260 nm, the relative refractive index differences $\Delta_1$ and $\Delta_2$ of the cores 11 and 12 with respect to the clad 30 are about 0.27% to 0.50% to propagate these lights in the single mode. Similarly, when wavelengths of lights propagating in the cores 11 and 12 are 1500 nm, the relative refractive index differences $\Delta_1$ and $\Delta_2$ of the cores 11 and 12 with respect to the clad 30 are about 0.35% to 0.70% to propagate these lights in the single mode. Meanwhile, with the embodiment, the refractive index $n_1$ of the center core 11 and the refractive indices $n_2$ of the respective outer periphery side cores 12 are different from each other, and therefore the relative refractive index difference $\Delta_1$ of the center core 11 and the relative refractive index differences $\Delta_2$ of the respective outer periphery side cores 12 are different form each other.

Figure 2:
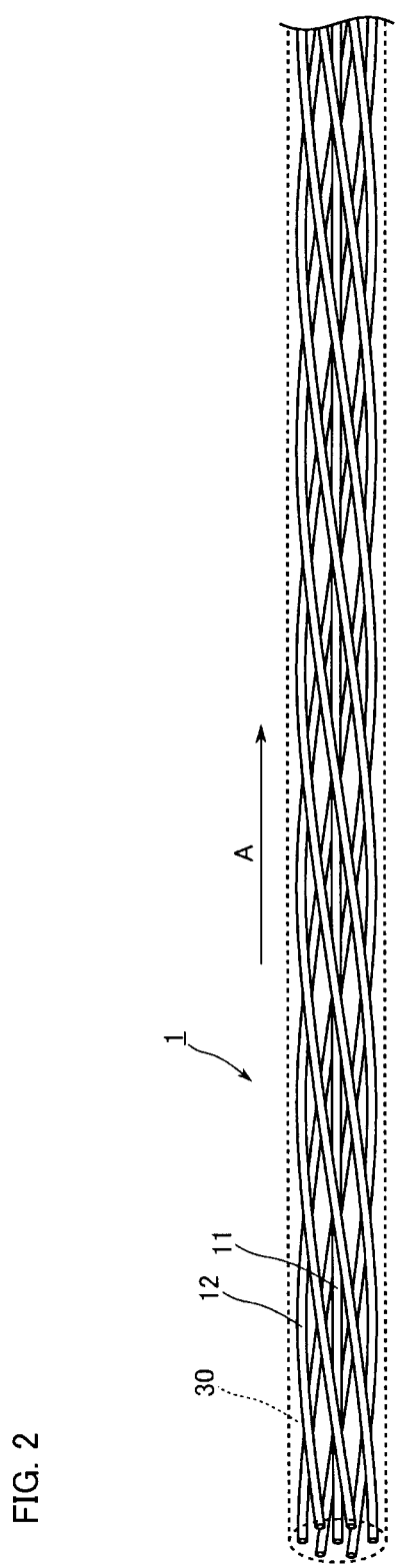
FIG. 2 is a view illustrating a state of the multicore fiber in FIG. 1.

FIG. 2 is a view illustrating the state of the cores 11 and 12 of the multicore fiber 1 in FIG. 1. In addition, in FIG. 2, for ease of understanding, the clad 30 is shown by a broken line, the inner protective layer 31 and the outer protective layer 32 are not shown and scales of the multicore fiber 1 in the longitudinal direction and the diameter direction are changed from an actual multicore fiber.

As illustrated in FIG. 2, the center core 11 is arranged along the center of the axis of the clad 30, and the outer periphery side cores 12 are spirally arranged to rotate around the center axis of the clad 30 in the identical direction. In FIG. 2, the outer periphery side cores 12 are arranged to rotate rightward along a direction of an arrow A. That is, in the multicore fiber 1, the cores 12 are solidified in a state in which the cores 12 are formed in the spiral pattern, and the cores 12 are permanently twisted.

In addition, in FIG. 2, the spiral outer periphery side cores 12 rotate around the center axis of the clad 30 at the same pitch. That is, in all sections of the multicore fiber 1 in the longitudinal direction, the number of rotations of the cores 12 per unit length of the multicore fiber 1 is fixed.

However, in the multicore fiber 1, the spiral cores 12 have sections in which the pitch at which the cores 12 rotate around the center axis of the clad 30 changes. That is, the pitch of rotation of the spiral cores 12 may be 1 time/m in, for example, a given predetermined section and may be 0.5 time/m in another section, and, moreover, the cores 12 may rotate at another pitch in still another section. Further, the pitch of the spiral cores 12 may change at all sections.

Furthermore, although not illustrated in particular, the spiral cores 12 may repeat rightward rotation and leftward rotation around the center axis of the clad 30. That is, the spiral cores 12 may be arranged to rotate rightward in a predetermined section, and rotate leftward in a section adjacent to this predetermined section. Further, in this case, the cores 12 do not rotate around the center of the axis of the clad 30 between the section for rightward rotation and the section for leftward rotation of the cores 12, and may be arranged in parallel to the core 11. Furthermore, a length of each section for rightward rotation and a length of each section for leftward rotation of the spiral cores 12 may not be fixed.

Still further, the cores 12 preferably rotate around the center axis of the clad 30 at a pitch equal to or more than 1 time/m on average, and, more preferably, rotate at a pitch equal to or more than 4 time/m on average. In addition, when the cores 12 rotate in a right direction and a left direction, respectively, as described above, this pitch is calculated by adding the number of rotations in the right direction and the number of rotations in the left direction as positive values. When, for example, the spiral cores 12 rotate 0.5 times to the right around the center axis of the clad 30 in a section of 0.5 m of the multicore fiber 1 and then rotates 0.5 times to the left in a subsequent section of 0.5 m, the number of rotations per 1 m is 0.5+0.5=1 time and the pitch of the cores 12 in this case are 1 time/m.

Next, a function of the multicore fiber 1 according to the embodiment will be described.

A change of the refractive index in case that an optical fiber is bent can be found by, for example, an equivalent refractive index method. That is, the refractive index in case that the optical fiber is bent can be equivalently found by multiplying a refractive index distribution of a linear optical fiber with (1+r/R cos θ). Meanwhile, (r, θ) is polar coordinates in a vertical plane of the optical fiber in the longitudinal direction, θ=0 is a direction in which the optical fiber is bent, and r is a distance from the center of the optical fiber. Further, R indicates a curvature radius of the optical fiber.

Meanwhile, the multicore fiber 1 is bent in a direction along a B-B line in FIG. 1A. That is, the B-B line is a line of θ=0. FIG. 3 is a view illustrating a state of the multicore fiber 1 when the multicore fiber 1 is bent as described above. More specifically, FIG. 3A is a view illustrating a structure in the vertical cross-section of the multicore fiber 1 in the longitudinal direction, and FIG. 1B is a view illustrating a distribution of equivalent refractive indices in the B-B line in FIG. 1A. In addition, FIG. 3B illustrates broken lines of refractive index distributions when the multicore fiber 1 illustrated in FIG. 1B is linear. As illustrated in FIG. 3, when the multicore fiber 1 is bent along the B-B line, the center of the multicore fiber 1 is the original point, a direction outside a bend on the B-B line is θ=0, and a direction inside the bend on the B-B line is θ=180 degrees. In this case, according to the above equation, the equivalent refractive indices of the outer cores and clad are higher, and the equivalent refractive indices of the inner core and clad are lower.

Hence, when the outer periphery side cores 12 have higher refractive indices than that of the center core 11 as described above, if the curvature radius of the bend of the multicore fiber 1 has a specific length, the effective refractive index of the center core 11, the effective refractive indices of the cores positioned inside the bend of the multicore fiber 1 among the outer periphery side cores 12, and the effective refractive index of one core 12 match in some cases. Further, although not illustrated in particular using the drawings, when the center core 11 has a higher refractive index than those of the outer periphery side cores 12 unlike the above description, the effective refractive index of the center core 11, effective refractive indices of cores positioned outside the bend of the multicore fiber 1 among the outer periphery side cores 12 and the effective refractive index of one core 12 match in some cases.

In addition, although the effective refractive indices and the refractive index of actual glass are the same in the above description for ease of understanding, the effective refractive index is actually a parameter determined to include spreading of light to be led in the cross-section. In addition, the effective refractive index has a one-to-one relationship with the propagation constant.

However, in the multicore fiber 1 according to the embodiment, vertical cross-sections of the spirally arranged cores 12 of the multicore fiber 1 in the longitudinal direction change along the longitudinal direction of the multicore fiber 1. Hence, when the multicore fiber is bent at a specific curvature radius and disposed, even if a section in which the refractive index of the center core 11 and the effective refractive index of one core 12 positioned inside the bend direction among the outer peripheral side cores 12 is produced as illustrated in FIG. 3, a positional relationship between the center core 11 and the specific outer peripheral side core 12 the effective refractive index of which matches with this center core 11 changes, so that the effective refractive indices of this specific core 12 and the center core 11 do not match over a long section. Consequently, it is possible to prevent deterioration of crosstalk between this specific core 12 and the center core 11. Thus, the multicore fiber 1 according to the embodiment can prevent deterioration of crosstalk between specific cores even when the multicore fiber 1 is disposed in a bent state, it is possible to suppress variation in crosstalk between all cores.

In addition, although a case has been described above where the effective refractive index of the specific outer peripheral side core 12 and the effective refractive index of the center core 11 match, when, for example, the effective refractive indices of the outer periphery side cores 12 match, the effective refractive indices of the respective cores 12 do not match over a long section likewise. Consequently, it is possible to prevent deterioration of crosstalk between the respective cores 12.

This multicore fiber 1 is manufactured as follows.

First, a core glass member including a portion which forms the core 11 and the cores 12 is arranged in the clad 30 or a clad glass member which forms part of the clad 30, and is collapsed to make a fiber base material which has the same arrangement in the cross section as the cores 11 and 12 and the clad 30 illustrated in FIG. 1A.

Further, the made base material is heated, melted and spun to make a multicore fiber, and this multicore fiber is covered by the inner protective layer 31 and the outer protective layer 32. In this case, the multicore fiber immediately after spinning is rotated around the center of the axis. Thus, by rotating the multicore fiber rotated around the center of the axis, a force of rotation around the center of the axis is transmitted to a semiconductor of the multicore fiber which is not yet spun from the fiber base material and solidified and, as illustrated in FIG. 2, the outer peripheral side cores 12 are spirally formed to rotate around the center axis of the clad 30. In other words, the outer peripheral side cores 12 are permanently twisted.

By manufacturing the multicore fiber in which the cores are spirally arranged, it is possible to prevent deterioration of crosstalk continuously and permanently upon formation of a tape or formation of cables using fibers, upon a laying operation and under actual environment. Further, from the view point of mechanical reliability, it is preferable to spirally arrange the cores of the multicore fiber in advance.

To rotate around the center the multicore fiber immediately after spinning, a turn pulley which the spun multicore fiber contacts first only needs to be rotated around center of the axis of the multicore fiber and moved. By rotating this turn pulley in one direction, the cores 12 have shapes for rotating in one direction around the center axis of the clad 30. Further, by swinging and rotating the turn pulley without rotating the turn pulley in one direction, the cores 12 have shapes for alternately rotating rightward and leftward around the center axis of the clad 30.

Although the present invention has been described above by reference to a certain embodiment as an example, the present invention is not limited thereto.

For example, although the number of cores is seven with the embodiment, the number of cores is not limited in particular as long as the number of cores is plural. Further, at least one core needs to be spirally arranged to rotate around the center axis of a clad and, for example, the number of outer periphery side cores 12 may be one or seven or more in FIG. 1. Furthermore, as long as the overall number of cores is plural, the core 11 along the center axis of the clad 30 is not indispensable requirement. For example, three cores may be spirally arranged drawing a rectangular triangle in the clad 30. Further, the multicore fiber according to the present invention does not require that a plurality of cores are symmetrical with respect to the center axis of the clad 30, and, for example, a plurality of cores may be aligned in a grid of five rows and four columns.

As described above, the multicore fiber according to the present invention can be appropriately modified according to use as long as the multicore fiber has a plurality of cores, and at least one of these cores is spirally arranged to rotate around the center axis of the clad. FIG. 4 is a view illustrating a modified example of the multicore fiber.

Figure 4A:
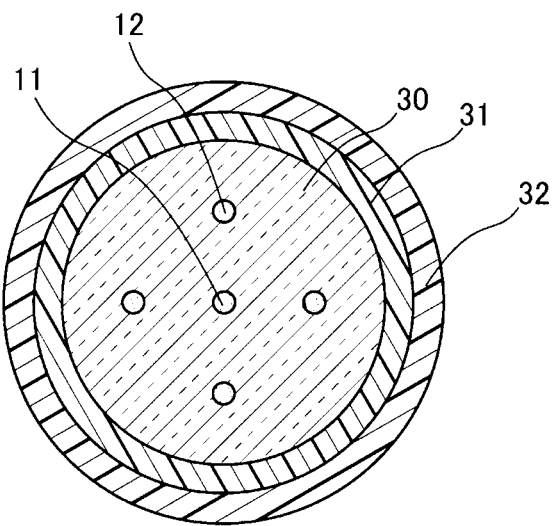
FIG. 4A, FIG. 4B and FIG. 4C are a view illustrating a modified example of a multicore fiber.
Figure 4B:
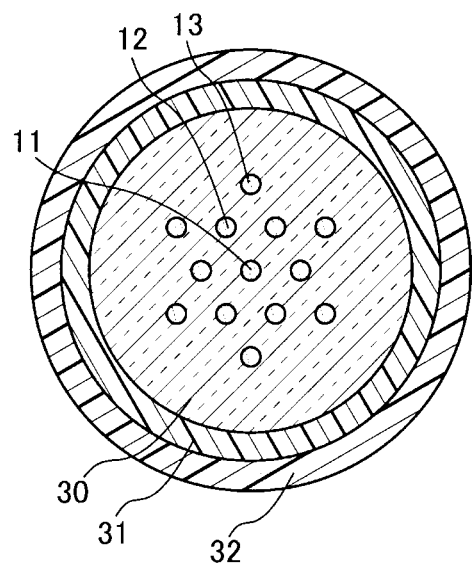
Figure 4C:
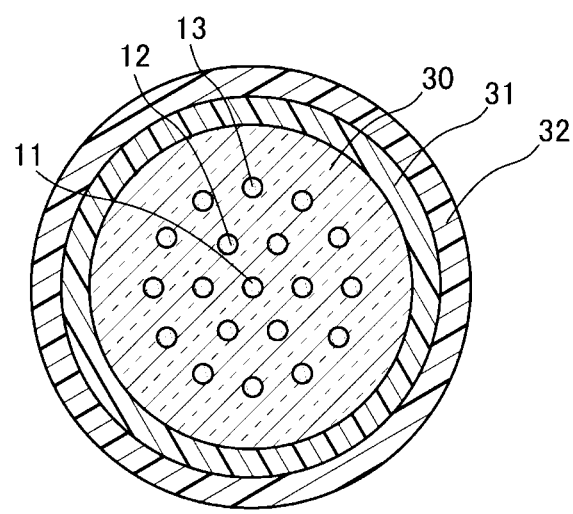

FIG. 4A is a view illustrating a multicore fiber in which one core 11 is arranged in the center, the four cores are arranged to surround this core and inter-center distances between the core 11 and the cores 12 are equalized. FIG. 4B is a view illustrating an example where six cores 13 are provided on an outer periphery side of the outer periphery side cores 12 in the multicore fiber 1 according to the embodiment illustrated in FIG. 1A, and the respective cores 11 to 13 are arranged in a triangular grid and arranged in a start shape as a whole. Further, FIG. 4C is a view illustrating an example where the twelve cores 13 are provided at equal intervals on the outer periphery side of the outer periphery side cores 12 in the multicore fiber 1 according to the embodiment illustrated in FIG. 1A, and the nineteen cores are arranged in a triangular grid and are closely packed.

Figure 5A:
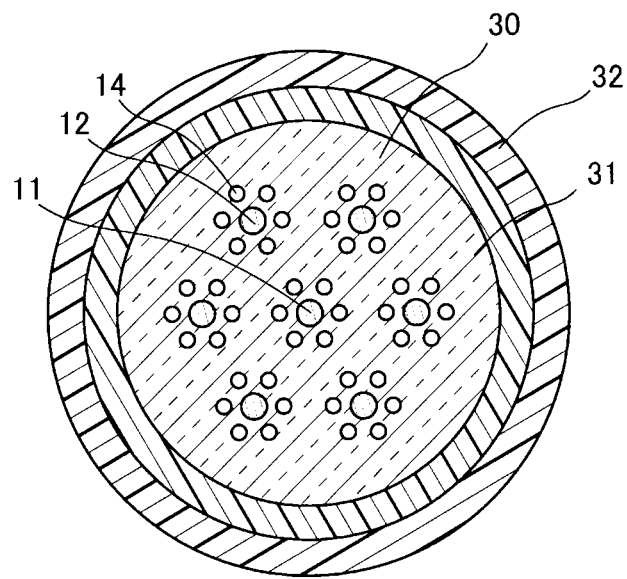
FIG. 5A and FIG. 5B are a view illustrating a modified example of the multicore fiber.
Figure 5B:
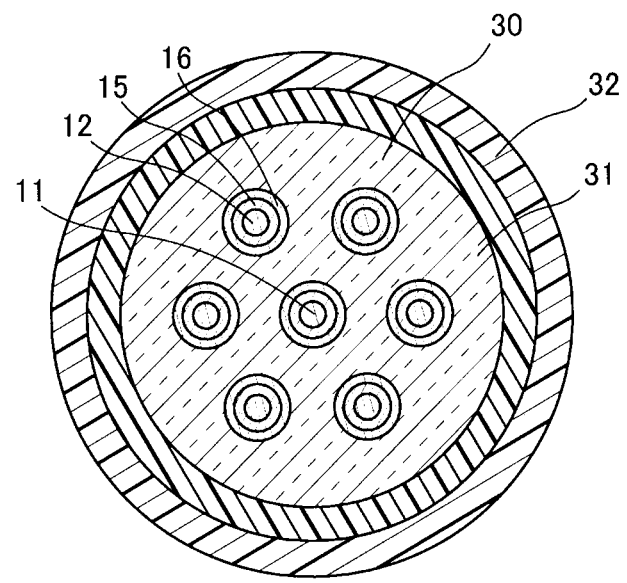

Furthermore, FIG. 5A is a view illustrating an example where the respective cores 11 and 12 in the multicore fiber 1 according to the embodiment illustrated in FIG. 1A are surrounded by a plurality of holes 14. In this case, the respective holes 14 function to more firmly trap lights in the cores 11 and 12, so that it is possible to further suppress crosstalk between adjacent cores. Further, FIG. 5B is a view illustrating an example where the respective cores 11 and 12 in the multicore fiber 1 according to the embodiment illustrated in FIG. 1A are surrounded by first clads 15 having the same refractive index as the clad 30 and these first clads 15 are surrounded by second clads 16 having refractive indices than the clad 30. That is, a core element including the cores 11 (12), the first clads 15 and the second clads 16 is a so-called type, so that lights are more firmly trapped in the cores 11 and 12 and, consequently, it is possible to further suppress crosstalk between adjacent cores.

Further, with the embodiment, the diameter of the spiral core 11 and the diameters of the cores 12 adjacent to this core 11 are different from each other. However, the present invention is not limited thereto, and the diameters of all cores may be equalized.

Further, with the embodiment, the refractive index of the core 11 and the refractive indices of the cores 12 are different from each other. However, the present invention is not limited thereto, and refractive indices of all cores may be equal. In addition, although the refractive indices $n_2$ of the cores 12 are higher the refractive index $n_1$ of the core 11 with the embodiment, the refractive index $n_1$ of the core 11 may be higher than the refractive indices $n_2$ of the cores 12.

EXAMPLES

Hereinafter, although the present invention will be more concretely explained with examples and comparative examples, the present invention is not limited thereto.

Example 1

A multicore fiber is made in which one core is arranged in the center, six cores are arranged to surround this core and inter-center distances between the respective cores are equal. A structure in a vertical cross-section of this multicore fiber in the longitudinal direction is the same as in the multicore fiber illustrated in FIG. 1A.

In this multicore fiber, a diameter $R_{CO}$ of each core is 6.5 µm, a center-inter distance L between the cores is 36 µm and an outer diameter $R_{CL}$ of the clad is 132 µm. Further, relative refractive index differences Δ of the cores with respect to the clad are each virtually 0.6%, and the relative refractive index differences Δ between the center axis and the peripheral cores have a slight difference (about 1%). Furthermore, by twisting the multicore fiber in left and right directions to spin, the outer periphery side cores rotate about 0.25 times at a time around the center axis of the clad in the left and right directions per 1 m in the entire length on average to provide a rotation pitch of about 0.5 time/m on average.

Example 2

A multicore fiber is made which is the same as a multicore fiber according to Example 1 except that outer periphery side cores rotate about 0.5 times at a time around the center axis of a clad in the left and right directions per 1 m in the entire length on average to provide a rotation pitch of about 1.0 time/m on average.

Example 3

A multicore fiber is made which is the same as a multicore fiber according to Example 1 except that outer periphery side cores rotate about 1 time at a time around the center axis of a clad in the left and right directions per 1 m in the entire length on average to provide a rotation pitch of about 2.0 time/m on average.

Example 4

A multicore fiber is made which is the same as a multicore fiber according to Example 1 except that outer periphery side cores rotate about 2 times at a time around the center axis of a clad in the left and right directions per 1 m in the entire length on average to provide a rotation pitch of about 4.0 time/m on average.

Example 5

A multicore fiber is made which is the same as a multicore fiber according to Example 1 except that outer periphery side cores rotate about 4 times at a time around the center axis of a clad in the left and right directions per 1 m in the entire length on average to provide a rotation pitch of about 8.0 time/m on average.

Comparative Example 1

A multicore fiber is made which is the same as a multicore fiber according to Example 1 except that the multicore fiber is spun without being twisted, and outer periphery side cores do not rotate around the center axis of a clad and are arranged along the center axis of the clad.

Example 6

A multicore fiber is made which is the same as a multicore fiber according to Example 1 except that a diameter $R_{CO}$ of each core is 7.2 µm, a center-inter distance L between the cores is 35 µm, an outer diameter $R_{CL}$ of the clad is 125 µm and the relative refractive differences Δ of the respective cores with respect to the clad are each 0.4%.

Example 7

A multicore fiber is made which is the same as a multicore fiber according to Example 6 except that outer periphery side cores rotate about 0.5 times at a time around the center axis of a clad in the left and right directions per 1 m to provide a rotation pitch of about 1.0 time/m on average.

Example 8

A multicore fiber is made which is the same as a multicore fiber according to Example 6 except that outer periphery side cores rotate about 1.0 time at a time around the center axis of a clad in the left and right directions per 1 m in the entire length on average to provide a rotation pitch of about 2.0 time/m on average.

Example 9

A multicore fiber is made which is the same as a multicore fiber according to Example 6 except that outer periphery side cores rotate about 2 times at a time around the center axis of a clad in the left and right directions per 1 m in the entire length on average to provide a rotation pitch of about 4.0 time/m on average.

Example 10

A multicore fiber is made which is the same as a multicore fiber according to Example 6 except that outer periphery side cores rotate about 4 times at a time around the center axis of a clad in the left and right directions per 1 m in the entire length on average to provide a rotation pitch of about 8.0 time/m on average.

Comparative Example 2

A multicore fiber is made which is the same as a multicore fiber according to Example 6 except that the multicore fiber is spun without being twisted, and outer periphery side cores do not rotate around the center axis of a clad and are arranged along the center axis of the clad.

Next, each of the made multicore fibers is bent at the curvature radius of 200 mm, and receives an input of an optical signal having a wavelength of 1550 nm in the center core. Further, crosstalk between six outer periphery side cores in a length of 1 km is measured. Conditions of multicore fibers according to Examples 1 to 10 and Comparative Examples 1 and 2, and average values, maximum values, minimum values and standard deviations of amounts of crosstalk measured from these multicore fibers are illustrated in Table 1.

In each optical fiber, the magnitude of crosstalk varies in six outer periphery side optical fibers. Further, Table 1 illustrates a result that the magnitude of the maximum crosstalk in the multicore fibers according to Examples 1 to 5 is less than the magnitude of the maximum crosstalk of the multicore fiber according to Comparative Example 1. Similarly, Table 1 illustrates a result that the magnitude of the maximum crosstalk in the multicore fibers according to Examples 6 to 10 is less than the magnitude of the maximum crosstalk of the multicore fiber according to Comparative Example 2.

Consequently, it is found that the multicore fiber according to the present invention can prevent crosstalk between specific cores from escalating even when the multicore fiber is disposed in a bent state.

Further, Table 1 illustrates a result that a standard deviation of crosstalk between the six outer periphery cores in the multicore fibers according to Examples 1 to 5 is less than a standard deviation of crosstalk between six outer periphery side cores according to Comparative Example 1. Similarly, Table 1 illustrates a result that a standard deviation of crosstalk between the six outer periphery cores in the multicore fibers according to Examples 6 to 10 is less than a standard deviation of crosstalk between six outer periphery side cores according to Comparative Example 2.

Consequently, it is found that the multicore fiber according to the present invention can suppress variation in the amount of crosstalk between specific cores even when the multicore fiber is disposed in a bent state.

Further, as is clear from Table 1, when the pitch is time/m or more on average, the variation in crosstalk between the cores becomes substantially a little, and, when the pitch is 4 time/m or more on average, the variation becomes less.

Example 11

A multicore fiber is made in which one core is arranged in the center, four cores are arranged to surround this core and inter-center distances between respective cores are equal. A structure in a vertical cross-section of this multicore fiber in the longitudinal direction is the same as in the multicore fiber illustrated in FIG. 4A.

In this multicore fiber, a diameter of each core is 6.9 μm, a center-inter distance between the center core and the peripheral cores is 37 μm and an outer diameter of the clad is 124 μm. Further, relative refractive index differences Δ of the cores with respect to the clad are each 0.42%. Furthermore, by span-spinning the multicore fiber to spin, the outer periphery side cores rotate about 1.4 times at a time around the

TABLE 1

|  | $R_{co}$ (μm) | L (μm) | $R_{cl}$ (μm) | Δ (%) | PITCH (time/m) | AVERAGE (dB) | MAXIMUM (dB) | MINIMUM (dB) | STANDARD DEVIATION (dB) |
|---|---|---|---|---|---|---|---|---|---|
| EXAMPLE 1 | 6.5 | 36 | 132 | 0.6 | 0.5 | −46.4 | −39.4 | −53.6 | 7.37 |
| EXAMPLE 2 | 6.5 | 36 | 132 | 0.6 | 1.0 | −42.7 | −39.0 | −46.8 | 2.50 |
| EXAMPLE 3 | 6.5 | 36 | 132 | 0.6 | 2.0 | −44.6 | −41.9 | −47.5 | 1.93 |
| EXAMPLE 4 | 6.5 | 36 | 132 | 0.6 | 4.0 | −48.0 | −46.5 | −51.1 | 1.76 |
| EXAMPLE 5 | 6.5 | 36 | 132 | 0.6 | 8.0 | −48.1 | −46.6 | −50.1 | 1.33 |
| COMPARATIVE EXAMPLE 1 | 6.5 | 36 | 132 | 0.6 | 0.0 | −46.2 | −32.9 | −54.2 | 9.57 |
| EXAMPLE 6 | 7.2 | 35 | 125 | 0.4 | 0.5 | −28.5 | −19.9 | −40.2 | 8.54 |
| EXAMPLE 7 | 7.2 | 35 | 125 | 0.4 | 1.0 | −25.3 | −22.8 | −28.9 | 2.66 |
| EXAMPLE 8 | 7.2 | 35 | 125 | 0.4 | 2.0 | −26.3 | −23.9 | −29.8 | 2.07 |
| EXAMPLE 9 | 7.2 | 35 | 125 | 0.4 | 4.0 | −30.3 | −27.6 | −31.7 | 1.54 |
| EXAMPLE 10 | 7.2 | 35 | 125 | 0.4 | 8.0 | −30.4 | −28.4 | −32.1 | 1.24 |
| COMPARATIVE EXAMPLE 2 | 7.2 | 35 | 125 | 0.4 | 0.0 | −31.3 | −18.1 | −42.1 | 8.76 | center axis of the clad in the left and right directions per 1 m in the entire length on average to provide a rotation pitch of about 2.8 time/m on average.

Next, the made multicore fiber is wound with the curvature radius of 140 mm, and receives an input of an optical signal having a wavelength of 1550 nm in the center core. Further, crosstalk between four outer periphery side cores in a length of 1 km is measured. An average value of the amount of crosstalk measured from this multicore fiber is −38.4 dB, the maximum value is −36.4 dB, the minimum value is −39.9 dB and the standard deviation is 1.46 dB. As described above, the crosstalk between the four outer periphery side cores has a little variation.

Example 12

A multicore fiber is made in which one core is arranged in the center, six cores are arranged to surround this core and inter-center distances between the respective cores are equal. A structure in a vertical cross-section of this multicore fiber in the longitudinal direction is the same as in the multicore fiber illustrated in FIG. 1A.

In this multicore fiber, a diameter of each core is 8.1 μm, a center-inter distance between the cores is 35 μm and an outer diameter of the clad is 125 μm. Further, relative refractive index differences of the cores with respect to the clad are each 0.36%. Furthermore, by span-spinning the multicore fiber to spin, the outer periphery side cores rotate about 2.65 times at a time around the center axis of the clad in the left and right directions per 1 m in the entire length on average to provide a rotation pitch of about 5.3 time/m on average.

Next, each of the made multicore fibers is wound with the curvature radius of 280 mm, and receives an input of an optical signal having a wavelength of 1550 nm in the center core. Further, crosstalk between six outer periphery side cores in a length of 1 km is measured. An average value of the amount of crosstalk measured from this multicore fiber is −25.4 dB, the maximum value is −23.3 dB, the minimum value is −25.6 dB and the standard deviation is 0.82 dB. As described above, the crosstalk between the six outer periphery side cores has a little variation.

Example 13

A multicore fiber is made in which one core is arranged in the center, six cores are arranged to surround this core, six cores are further arranged on the outer periphery side of the six cores adjacent to the center core and inter-center distances between respective cores are equal. A structure in a vertical cross-section of this multicore fiber in the longitudinal direction is the same as in the multicore fiber illustrated in FIG. 4B.

In this multicore fiber, a diameter of each core is 6.1 μm, a center-inter distance between the respective cores is 35 μm and an outer diameter of the clad is 159 μm. Further, relative refractive index differences of the cores with respect to the clad are each about 0.70%, and a refractive index difference of the center core and the relative refractive index differences of the peripheral cores have a difference of about 2%. Furthermore, by span-spinning the multicore fiber to spin, cores other than the center core rotate about 1.6 times at a time around the center axis of the clad in the left and right directions per 1 m in the entire length on average to provide a rotation pitch of about 3.2 time/m on average.

Next, each of the made multicore fibers is wound with the curvature radius of 500 mm, and receives an input of an optical signal having a wavelength of 1550 nm in the center core. Further, crosstalk between six outer periphery side cores adjacent to the center core in a length of 1 km is measured. An average value of the amount of crosstalk measured from this multicore fiber is −44.6 dB, the maximum value is −42.2 dB, the minimum value is −48.8 dB and the standard deviation is 2.44 dB. As described above, the crosstalk between the six outer periphery side cores adjacent to the center core has a little variation.

Example 14

A multicore fiber is made in which one core is arranged in the center, six cores are arranged to surround this core, twelve cores are further arranged on the outer periphery side of the six cores adjacent to the center core and inter-center distances between respective cores are equal. A structure in a vertical cross-section of this multicore fiber in the longitudinal direction is the same as in the multicore fiber illustrated in FIG. 4C.

In this multicore fiber, a diameter of each core is 7.6 μm, a center-inter distance L between the cores is 39 μm and an outer diameter of the clad is 188 μm. Further, relative refractive index differences of the cores with respect to the clad are each 0.39%, and a refractive index difference of the center core and the relative refractive index differences of the peripheral cores have a difference of about 3%. Furthermore, by span-spinning the multicore fiber to spin, cores other than the center core rotate about 0.7 times at a time around the center axis of the clad in the left and right directions per 1 m in the entire length on average to provide a rotation pitch of about 1.4 time/m on average.

Next, each of the made multicore fibers is wound with the curvature radius of 500 mm, and receives an input of an optical signal having a wavelength of 1550 nm in the center core. Further, crosstalk between six outer periphery side cores adjacent to the center core in a length of 1 km is measured. An average value of the amount of crosstalk measured from this multicore fiber is −51.7 dB, the maximum value is −49.5 dB, the minimum value is −54.3 dB and the standard deviation is 2.12 dB. As described above, the crosstalk between the six outer periphery side cores adjacent to the center core has a little variation.

Example 15

A multicore fiber is made in which one core is arranged in the center, six cores are arranged to surround this core, six holes are further formed adjacent to the respective cores to surround the respective cores and inter-center distances between respective cores are equal. A structure in a vertical cross-section of this multicore fiber in the longitudinal direction is the same as in the multicore fiber illustrated in FIG. 5A.

In this multicore fiber, a diameter of each core is 6.1 μm, a center-inter distance between the cores is 32 μm, an outer diameter of the clad is 125 μm, the diameter of each hole is 6.2 μm and the inter-center distance is between the core and each hole is 11 μm. Further, relative refractive index differences of the cores with respect to the clad are each 0.72%. Furthermore, by span-spinning the multicore fiber to spin, the outer periphery side cores rotate about 2.0 times at a time around the center axis of the clad in the left and right directions per 1 m in the entire length on average to provide a rotation pitch of about 4.0 time/m on average.

Next, each of the made multicore fibers is wound with the curvature radius of 500 mm, and receives an input of an optical signal having a wavelength of 1550 nm in the center core. Further, crosstalk between six outer periphery side cores in a length of 1 km is measured. An average value of the amount of crosstalk measured from this multicore fiber is −45.9 dB, the maximum value is −44.6 dB, the minimum value is −48.2 dB and the standard deviation is 1.30 dB. As described above, the crosstalk between the six outer periphery side cores has a little variation.

INDUSTRIAL APPLICABILITY

As described above, according to the present invention, it is possible to provide a multicore fiber which can prevent deterioration of crosstalk between specific cores even when the multicore is disposed non-linearly.

DESCRIPTION OF REFERENCE NUMERALS

1 . . . multicore fiber
11, 12 . . . core
14 . . . hole
15 . . . first clad
16 . . . second clad
30 . . . clad
31 . . . inner protective layer
32 . . . outer protective layer

The invention claimed is:

1. A multicore fiber comprising: a plurality of cores; and a clad surrounding an outer peripheral surface of each of the cores, wherein at least one of the cores is arranged spirally such that the core rotates around a center axis of the clad, and
wherein the spiral core and a core adjacent to the spiral core comprise different refractive indices from each other.

2. The multicore fiber according to claim 1, wherein the spiral core comprises a section in which a pitch at which the core rotates around the center axis of the clad changes.

3. The multicore fiber according to claim 2, wherein the pitch of the spiral core changes at all sections.

4. The multicore fiber according to claim 1, wherein the spiral core repeats rightward rotation and leftward rotation around the center axis of the clad.

5. The multicore fiber according to claim 4, wherein an average length of a section for the rightward rotation and an average length of a section for leftward rotation of the spiral core are equal.

6. The multicore fiber according to claim 5, wherein a length of each section for the rightward rotation and a length of each section for leftward rotation of the spiral core are not fixed.

7. The multicore fiber according to claim 5 or 6, wherein two or more cores are spirally arranged such that the cores rotate around the center axis of the clad, and the spiral cores each rotate at a pitch equal to or more than an average 1 time/m on average around the center axis of each clad.

8. The multicore fiber according to claim 7, wherein the spiral cores each rotate at a pitch equal to or more than 4 time/m on average around the center axis of the clad.

9. The multicore fiber according to claim 1, wherein each of the core allows propagation of light in a single mode with respect to a wavelength of use.

10. The multicore fiber according to claim 1, wherein the spiral core and the core adjacent to the spiral core comprise different diameters.

11. The multicore fiber according to claim 1 or 10, wherein the two or more cores are arranged at equal intervals along an outer peripheral direction of the clad, and are spirally arranged such that the cores rotate around the center axis of the clad in an identical direction.

12. The multicore fiber according to claim 11, wherein one of the cores is arranged along the center axis of the clad.

* * * * *